United States Patent [19]

Kuwabara et al.

[11] Patent Number: 5,026,256
[45] Date of Patent: Jun. 25, 1991

[54] VARIABLE SPEED PUMPING-UP SYSTEM

[75] Inventors: Takao Kuwabara; Hisao Inoue, both of Hitachi; Hiroto Nakagawa, Mishima; Eizo Kita, Kyoto, all of Japan

[73] Assignees: Hitachi, Ltd.; The Kansai Electric Power Co. Ltd., both of Tokyo, Japan

[21] Appl. No.: 285,753

[22] Filed: Dec. 16, 1988

[30] Foreign Application Priority Data

Dec. 18, 1987 [JP] Japan .................. 62-318846
Dec. 18, 1987 [JP] Japan .................. 62-318850

[51] Int. Cl.$^5$ .............................................. F04B 49/00
[52] U.S. Cl. ......................................... 417/45; 417/53
[58] Field of Search ................................ 417/45, 53

[56] References Cited

U.S. PATENT DOCUMENTS

| 4,201,925 | 5/1980 | Kuwabara et al. . |
| 4,253,794 | 3/1981 | Kuwabara ................................ 415/1 |
| 4,354,800 | 10/1982 | Kuwabara . |
| 4,382,745 | 5/1983 | Kuwabara et al. ...................... 415/1 |
| 4,474,528 | 10/1984 | Yokoyama . |
| 4,610,599 | 9/1986 | Long . |
| 4,694,189 | 9/1987 | Haraguchi et al. ................... 290/52 |
| 4,708,594 | 11/1987 | Shinmei et al. ....................... 417/45 |
| 4,754,156 | 6/1988 | Shiozaki et al. ...................... 290/52 |

FOREIGN PATENT DOCUMENTS

| 0243937 | 11/1987 | European Pat. Off. . |
| 61149583 | 7/1986 | Japan . |
| 61173698 | 8/1986 | Japan . |
| 61175271 | 8/1986 | Japan . |
| 6218069 | 8/1987 | Japan . |
| 1140128 | 1/1969 | United Kingdom . |

Primary Examiner—Leonard E. Smith
Assistant Examiner—David W. Scheuermann
Attorney, Agent, or Firm—Fay, Sharpe, Beall, Fagan, Minnich & McKee

[57] ABSTRACT

The operation of a variable speed electric driven pump turbine is monitored continuously during pumping to detect the operation point of the pump turbine, and to prevent it from falling into a hump characteristic region, which is recognizable on a graph of total dynamic head versus flow rate. Stalling occurs in the hump characteristic region as a result of a partial reverse flow of the water with respect to the runner. When the operation point of the pump turbine approaches the hump characteristic region, a corrective action is taken that includes increasing the output level of the electric driven pump turbine to increase its rotating speed, temporarily.

7 Claims, 10 Drawing Sheets

FIG. 3(a) MOTOR DRIVE POWER COMMAND $P_0$

FIG. 3(b) OPTIMUM GUIDE VANE OPENING SIGNAL $Y_a$

FIG. 3(c) OPTIMUM ROTATING SPEED SIGNAL $N_a$

FIG. 3(d) GUIDE VANE OPENING DEGREE $Y$

FIG. 3(e) PUMP INPUT $P_P$

FIG. 3(f) ACTUAL ROTATING SPEED $N$

FIG. 3(g) ACTUAL GENERATOR MOTOR OUTPUT $P_M$

MOTOR DRIVE POWER COMMAND $P_0$

FIG. 12 (b)

OPTIMUM GUIDE VANE OPENING SIGNAL $Y_a$

FIG. 12 (c)

OPTIMUM ROTATING SPEED SIGNAL $(N_a + \Delta N_a)$

FIG. 12 (d)

GUIDE VANE OPENING DEGREE Y

FIG. 12 (e)

PUMP INPUT $P_p$

FIG. 12 (f)

ACTUAL ROTATING SPEED N

FIG. 12 (g)

ACTUAL GENERATOR MOTOR OUTPUT $P_M$

FIG. 13

VARIABLE SPEED PUMPING-UP SYSTEM

BACKGROUND OF THE INVENTION

The present invention relates to a variable speed pumping-up system, and more particularly to a variable speed pumping-up system provided with a pump or a pump turbine which exhibits a stall characteristic with a reverse flow called a hump characteristic in an operating region of high total dynamic head.

The present invention relates to a variable speed pumping-up system, and more particularly to a method of controlling a variable speed pumping-up system sharing an upstream side pipe line or a downstream side pipe line with another hydraulic machine and having a pump or a pump turbine which exhibits a hump characteristic (a reverse flow characteristic) in a pump operation region.

Figure 7:
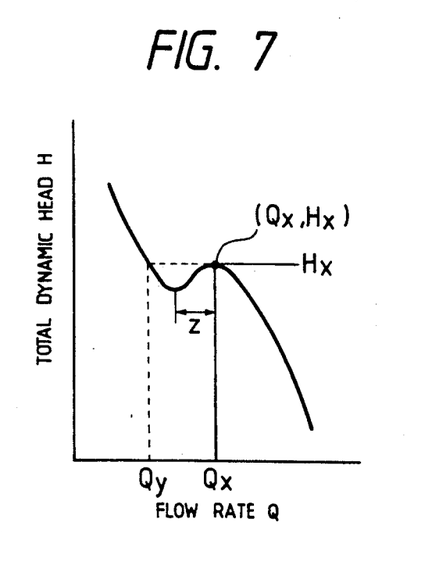
FIG. 7 is an H-Q characteristic curve showing the hump characteristic region.

It is considered that, in a pump turbine of a variable speed pumping-up system, the occurrence of the hump characteristic (wherein an operation of the pump turbine becomes $dH/dQ > 0$, wherein H is a total dynamic head including head loss in the upstream and downstream pipelines; and Q is a flow rate), which is shown by a region indicated by z in FIG. 7, in a higher total dynamic head operating region of the pump cannot generally be avoided.

The operation of the pump turbine in the hump characteristic region is unstable and causes vibrations and noises. Moreover, since a flow rate Q of water can never be stabilized in the range of z on the H versus Q curve of FIG. 7, an operating point of the pump turbine which has been approaching the point ($Q_X$, $H_X$) from the larger Q side changes suddenly to the point ($Q_Y$, $H_X$) as soon as the total dynamic head H reaches $H_X$. Thus abnormal water hammering phenomena occur in the upstream and downstream pipe lines.

Figure 8:
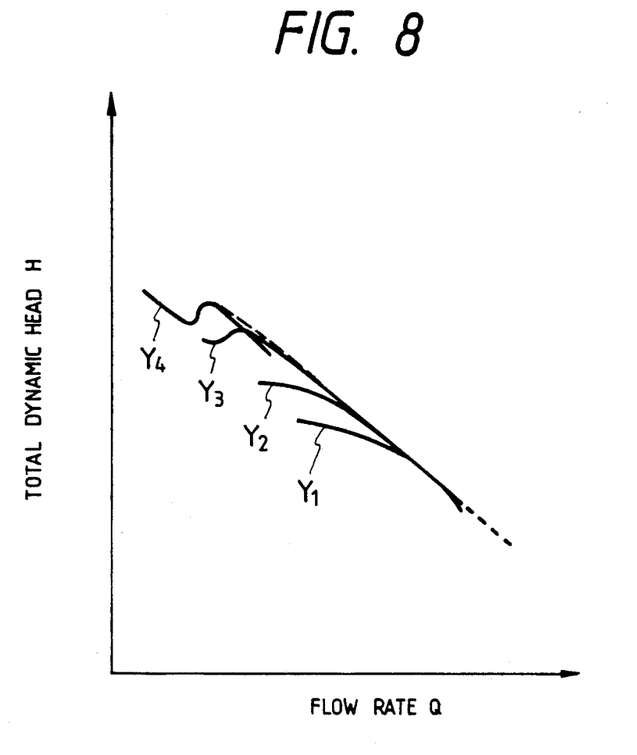
FIG. 8 is an H-Q characteristic curve graph showing the relationship of the degrees of opening of the guide vanes and the hump characteristic region.

The degree of depression of the hump characteristic differs depending upon the degree of opening of a guide vane as shown in FIG. 8. Each degree of opening of the guide vane in FIG. 8 is pointed out as $Y_4 < Y_3 < Y_2 < Y_1$. Even when a clear depression portion does not appear in the hump characteristic region, a similar problem occurs, more or less, since the flow of water in a runner of the pump turbine becomes unstable.

Figures 5, 6:
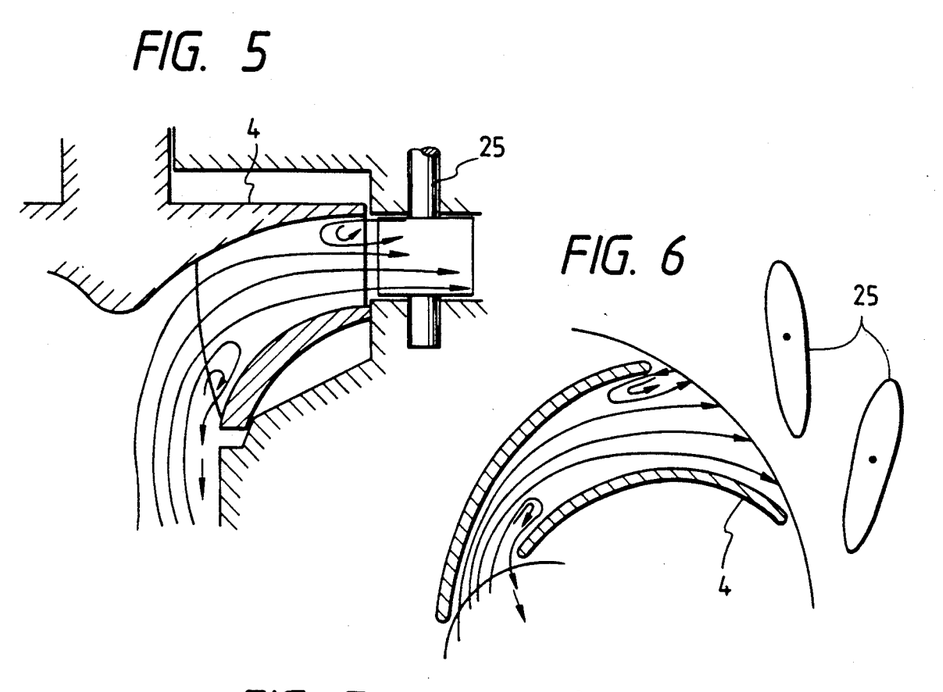
FIGS. 5 and 6 are explanatory views of typical flow patterns occurring in the hump characteristic region.

It is said that the cause of such a problem resides in that, when the total dynamic head of the pump turbine is too high under a given guide vane opening, the flow of water is remarkably reduced and distorted allowing partial reverse flows as shown in FIGS. 5 and 6. In this condition, the flow of water separates from the surface of the runner, and is put in a so-called stalling state.

Japanese Patent Laid-Open No. 186069/1987 includes a description about the effect that, when a load on a variable speed pumping-up apparatus is to be increased, the steps of initially increasing an output level of an electric drive unit so as to set a rotating speed of a pump turbine higher, and thereafter increasing a degree of opening of a guide vane should be taken for the purpose of preventing an operation point of the pump turbine from falling transitionally into the above mentioned hump characteristic region.

This publication also discloses a proposal that, when the load on the variable speed pumping-up apparatus is to be reduced, the closing of the guide vane and the decreasing of the rotating speed of the pump turbine are performed simultaneously so that the closing operation of the guide vane terminates earlier than the rotating speed decreasing operation of the pump turbine.

A case where the pump turbine shares its upstream side pipe line or downstream side pipe line with some other hydraulic machines, namely a case where a plurality of hydraulic machines are provided so that the hydraulic machines are connected to the pipe lines branching from a single pipe line, will now be considered.

When the operation condition of any of the additional hydraulic machines including the flow rate of water therein is changed, water hammering phenomena occur in this hydraulic machine and is transmitted to the pump turbine under consideration as well via the common pipe line, so that the pump turbine is necessarily influenced by the water hammering phenomena.

Especially, when the total dynamic head in an independent variable speed pumping-up system is swung higher, it is possible that the operation point of the pump turbine therein falls into the hump characteristic region even if the variable speed pumping-up system itself is set in a perfectly controllable region.

Japanese Patent Laid-Open No. 149583/1986 discloses a pump turbine starting method for a variable speed pumping-up system, in which, when a pump turbine is started, namely, when the pump turbine operation is shifted from a priming pressure established state with guide vanes fully closed to a regular variable speed pumping-up operation with a desired load, the rotating speed of the pump turbine is increased in proportion to the opening of the guide vanes, whereby a proper rotating speed of the pump turbine and a proper degree of opening of the guide vane with respect to the desired load are finally attained.

However, this known patent publication does not refer at all to a control method for a variable speed pumping-up system to be used after a regular variable speed pumping-up operation has been commenced.

As may be understood from the above stated description, the conventional controlling method for the variable speed pumping-up system for preventing the operation point of the pump turbine from falling into the hump characteristic region discloses only a part of the control needed for an independent variable speed pumping-up system.

Further, Japanese Patent Laid-Open No. 175271/1986 discloses a controlling method for a variable speed pumping-up system, in which, when the static head, i.e., difference between water level of an upper reservoir and water level of a lower reservoir has a predetermined value, the rotating speed of the pump turbine is raised and corrected in accordance with an overshoot thereof.

However, nothing is referred to with respect to the operation point of the pump turbine falling into the hump characteristic (the reverse flow characteristic) region by a temporary and much faster increase of the total dynamic head of this pump turbine due to the water hammering phenomena in the shared pipe line to which the present invention is directed.

As may be understood from the above stated description, the conventional controlling method for the variable speed pumping-up system for preventing the operation point of the pump turbine from falling into the hump characteristic region discloses only a part of the control that needs to be applied to an independent variable speed pumping-up system.

Namely, a countermeasure of the operation point of the pump turbine falling into the hump characteristic region due to the water hammering phenomena in the shared pipe line has not yet been proposed at all.

SUMMARY OF THE INVENTION

An object of the present invention is to provide a variable speed pumping-up system wherein a stable and reliable control of a pump or a pump turbine can be obtained.

Another object of the present invention is to provide a variable speed pumping-up system wherein a countermeasure can be taken to prevent an operation point from falling into a hump characteristic region.

A further object of the present invention is to provide a variable speed pumping-up system wherein a countermeasure can be taken to prevent an operation point from falling into a hump characteristic region, in spite of an interference caused by water hammering phenomena from another hydraulic machine sharing the same pipe line.

In accordance with the present invention, a variable speed pumping-up system is provided with self-correcting functions, i.e. the functions of, especially, monitoring the operation point of the pump or pump turbine continuously, and taking a timely and proper action at a suitable time to prevent the operation point from falling into the hump characteristic region in accordance with an approaching degree of the operation point to the hump characteristic region.

Even when a water hammering phenomena from another hydraulic machine sharing the same pipe lines is experienced, the operation point is maintained without allowing any abnormal approach into the hump characteristic region.

In accordance with the present invention, a variable speed pumping-up system will function properly as detailed below. First, (1) the degree Y of the opening of the guide vanes and the rotating speed N of the pump turbine are measured continuously. (2) Model test data, which has been stored in a memory, are referred to so that dynamic head $H_X$ corresponding to a starting point of a hump characteristic region is calculated as a function of the measured rotating speed N of the pump turbine and the measured opening degree Y of the guide vanes.

(3) A total dynamic (head H pressure head alone or pressure head plus velocity head at the outlet of the pump turbine) is measured. (4) A difference between the dynamic head $H_X$ and the total dynamic head H is calculated. (5) When this difference in dynamic heads has become not higher than a predetermined level, an overriding control is put into service so as to forcibly increase the output level of the pump drive unit and to correspondingly raise the rotating speed N of the pump turbine. This prevents the operation point of the pump turbine from falling into the hump characteristic region.

With note taken of the fact that, at the change of the operation state of another hydraulic machinery sharing the pipe line, especially at the start of another hydraulic machine in the pump mode or in an output rapid-increase operation thereof, the total dynamic head H of the particular variable speed pumping-up system is temporarily raised by the water hammering phenomena in the shared pipe line. Thus the rotating speed N of the pump turbine of the particular variable speed pumping-up system is temporarily raised and corrected before, or concurrently with, the start of the output rapid-increase operation of the other hydraulic machine.

Then, after the peril of the interference of the water hammering phenomena in the shared pipe line attributed to the hydraulic machinery disappears, the overriding control, i.e., the rotating speed correction control for the pump turbine is removed, and the control of the variable speed pumping-up system is restored to normal.

Even when the operation point of the variable speed pumping-up system nearly falls into the hump characteristic region for some internal reasons or from external influences from the water hammering phenomena occurring in another hydraulic machine by which the upstream side pipe line or the downstream side pipe line of the variable speed pumping-up system are shared therewith, the possibility that the operation point will fall into the hump characteristic region is detected in advance and a self-correcting control operation of the variable speed pumping-up system is carried out.

Namely, the rotating speed of the pump turbine is increased to immediately carry out an operation for preventing the operation point from falling into the hump characteristic region.

FIG. 8 is a graph showing the relationship between a rate Q and a total dynamic head H with respect to various degrees of guide vane openings for a given rotating speed N of the pump turbine.

In this case, the given rotating speed N is assumed to be an optimum speed for a desired power at that instant and it is further assumed that a highest efficiency operation of the variable speed pumping-up system is being carried out so as to obtain the relationship expressed by an envelope of the broken line shown in FIG. 8.

Figure 9:
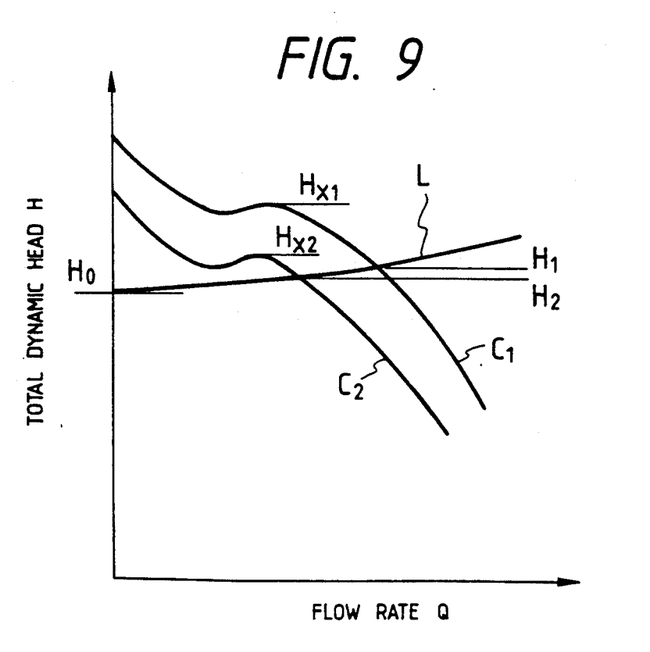
FIG. 9 is an H-Q characteristic curve graph showing the relationship between the rotating speed of the pump turbine and the hump characteristic region.

The two curves, $C_1$ and $C_2$ shown in FIG. 9 are also optimum setting curves for the respective power level operations, $C_1$ for higher power, $C_2$ for lower power which are determined in the same manner as the envelope curve of FIG. 8, with respect to the pump turbine rotating speeds $N_1$ and $N_2$ respectively. Referring to FIG. 9, the rotating speed $N_1$ of the curve $C_1$ is set to be larger than the rotating speed $N_2$ of the curve $C_2$.

It may be considered that, if the rotating speed N of the pump turbine is increased, these optimum setting curves $C_1$, $C_2$ move up to the right side as shown in FIG. 9.

When the difference $H_0$ in the static heads of water at the upper reservoir and the lower reservoir is constant, the total dynamic head H increases as the flow rate Q increases since friction losses in the pipe lines increase. A curve expressing this phenomena is called a service curve L under the given static head difference $H_0$ (refer to FIG. 9).

$H_1$ and $H_2$ are the respective dynamic heads at the rotating speeds $N_1$ and $N_2$ under the same static head difference $H_0$. It is assumed here that the optimizing controls of the rotating speed and the opening of the guide vanes in response to the desired power level is available in both the cases.

Even when the total dynamic head H increases temporarily as a result of the water hammering phenomena occurring in the shared pipe line, and, even when the operation point of the variable speed pumping-up system approaches the hump characteristic region, the rotating speed raising correction for the pump turbine is performed in advance, or concurrently therewith, and the operation point of the pump turbine within the hump characteristic region itself is avoided thereby making it possible to prevent the operation point from falling into the hump characteristic region as shown in FIG. 9.

This fact will be explained in detail in the following description.

As is clear from FIG. 9, as the rotating speed N of the pump turbine is increased, a difference between the service point of the total dynamic head H, i.e., $H_1$ or $H_2$ and a starting point $H_X$ (see FIG. 7) of the hump characteristic region on the same Q-H curve, i.e., $H_{1X}$ or $H_{2X}$ increases, and the operation point of the variable speed pumping-up system departs from the hump characteristic region.

When the rotating speed N of the pump turbine is increased, the starting point $H_X$ of the hump characteristic region goes up further, even under the same degree of opening of the guide vanes, and even when the total dynamic head H is temporarily increased by the affect of the water hammering phenomena in the shared pipe line. Thus it is possible to avoid the operating point of the variable speed pumping-up system from falling into the hump characteristic region.

DETAILED DESCRIPTION OF THE PREFERRED EMBODIMENT

One embodiment of a variable speed pumping-up system according to the present invention will now be explained with reference to FIG. 1.

Figure 1:
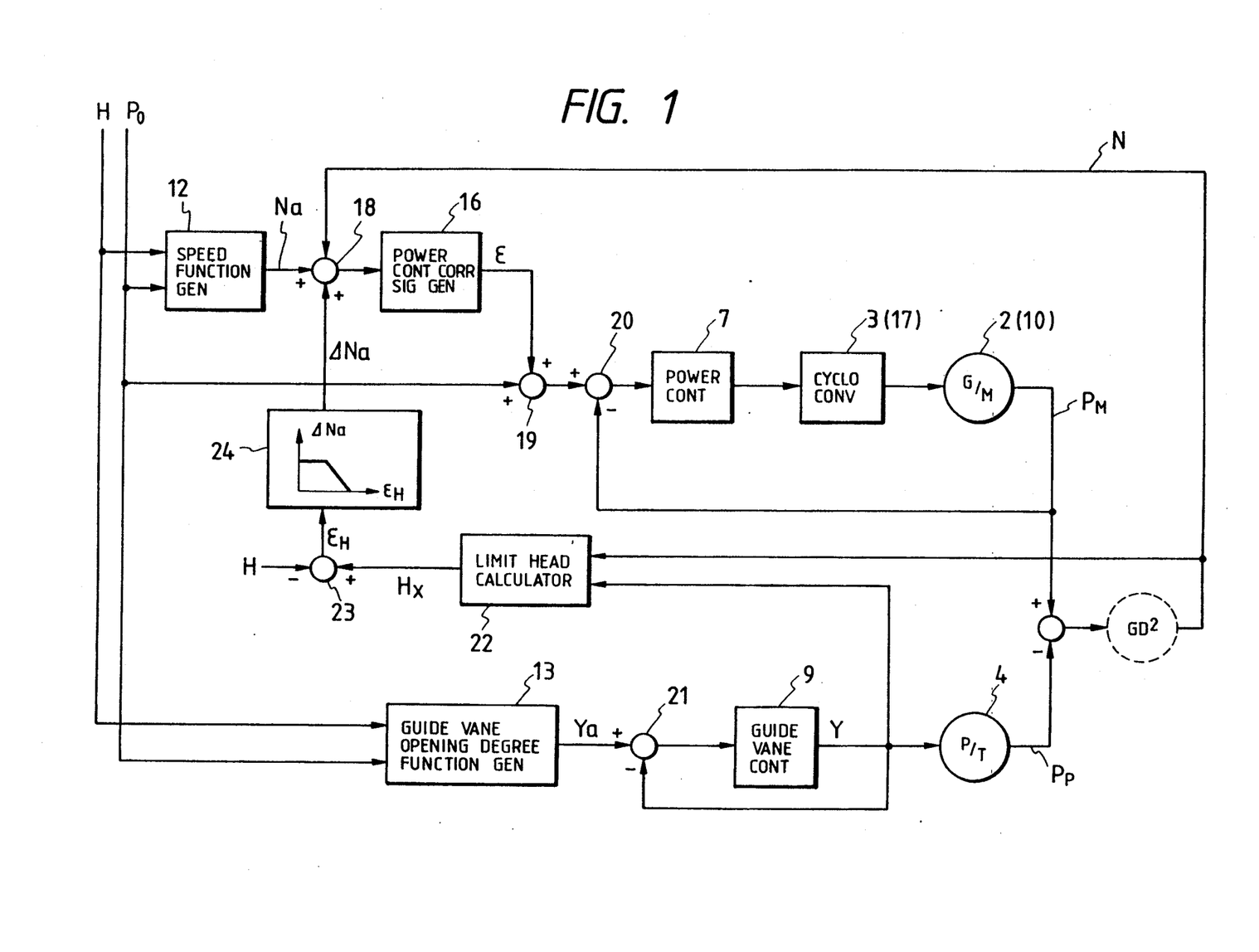
FIG. 1 is a control circuit schematic block diagram showing a variable speed pumping-up system according to one embodiment of the present invention.

FIG. 1 is a schematic block diagram of a control circuit of the variable speed pumping-up system according to the present invention. Since the details of an AC excitation circuit for controlling the cyclo converter do not have a direct relation with the present invention, they are not shown in FIG. 1.

A generator motor control loop consists of an adder or comparator 18, a power control correction signal generator 16, a power controller 7, a cyclo converter 3, a generator motor 2 with an inertia moment $GD^2$ and a power feedback circuit.

The speed function generator 12 receives as inputs a 1 motor drive power command $P_0$ from the outside and an actual total dynamic head H (that is defined as a simple difference between the static heads of the upper reservoir and the lower reservoir minus head losses in the upstream and downstream pipe lines) and provides as an output an optimum speed signal Na for the pump turbine 4.

The comparator 18 compares the sum of the optimum speed signal Na and the speed correction signal $\Delta Na$ with an actual rotating speed N and the calculates difference between the two.

The $GD^2$ schematic block indicates the effects of the inertia moments of the generator motor 2 and the pump turbine 4, and does not represent any separated special device.

The power control correction signal generator 16 includes an integrating element for use in eliminating a deviation signal $[(Na+\Delta Na)-N]$ in any steady state condition. A power correction signal $\epsilon$, an output from the power control correction signal generator 16, is added to the drive power command $P_0$ in an adder 19, and a v combined power command signal $(P_0+\epsilon)$ is compared with an actual generator motor output $P_M$ are in a comparator 20.

The power control circuit loop consists of the power controller 7, the cyclo converter 3, the generator motor 2, and a feedback circuit for the actual generator motor output $P_M$ and the power control circuit loop forms a negative feedback circuit. The power controller 7 includes an integrating element for use in eliminating a deviation $[(P_0+\epsilon)-P_M]$ in any steady state condition.

A guide vane control loop consists of a guide vane opening degree function generator 13, guide vanes 25 (see FIG. 2), a comparator 21, a guide vane controller 9, and a feedback of an actual opening degree Y of the guide vanes 25 and thus the guide vane control loop forms a negative feedback circuit.

The guide vane opening degree function generator 13 receives as input the motor drive power command $P_0$ and the actual total dynamic head H and gives as output an optimum guide vane opening signal Ya. The comparator 21 is adapted to compare the optimum guide vane opening signal Ya from the guide vane opening degree function generator 13 with an actual opening degree Y of the guide vanes 25.

The guide vanes 25 are controlled by the guide vane controller 9 so that a deviation (Ya−Y) from the comparator 21 becomes zero in any steady state by an error eliminating function or an integrating function device in the guide vane controller 9.

Thus, in a steady state condition $N=Na+\Delta Na$ (if $\Delta Na=0$, $N=Na$), $P_M=P_0+\epsilon$ and $Y=Ya$ can be attained by the error eliminating functions of the power control correction signal generator 16, the power controller 7 and the guide vane controller 9, each associated with their negative feedbacks, respectively as detailed above.

Any difference $(P_M-P_P)$, i.e., actual generator motor output power $P_M$ minus pump input power $P_P$, results in an acceleration/deceleration of the rotating parts of the generator motor 2 and the pump turbine 4, i.e., a change in the rotating speed N. The larger the inertia moment $GD^2$ is, the slower rate of speed change results in.

Since the rotating speed control loop consisting of the adder 18, the power control correction signal generator 16, the adder 19, the comparator 20, the power controller 7, the cyclo converter 3, the generating motor 2 and the inertia moment $GD^2$ and the feedback circuit of the actual rotating speed N to the adder 18 forms a negative feedback circuit as mentioned above, a control operation is carried out so that the difference $(P_M-P_P)$ becomes zero, that is, $P_M=P_P$, in any steady state condition.

If an error of the rotating speed function generator 12 is negligible, the pump input PP must be controlled naturally to be equal to the motor drive power command $P_0$, i.e. $P_P=P_0$ since the optimum guide vane opening signal Ya of the guide vanes 25 is the theoretically just corresponding to the motor drive power command $P_0$.

To sum up, $P_0=P_P=P_M=P_0+\epsilon$ is obtained, therefore, the level of the power correction signal $\epsilon$ is finally set to zero. Owing to the above operations, the actual generator motor output $P_M$ can be controlled to meet the motor drive power command $P_0$ from the outside without having deviation due to $\epsilon$.

The above description of the embodiment of FIG. 1 is graphically shown in FIG. 3.

Figure 3A:
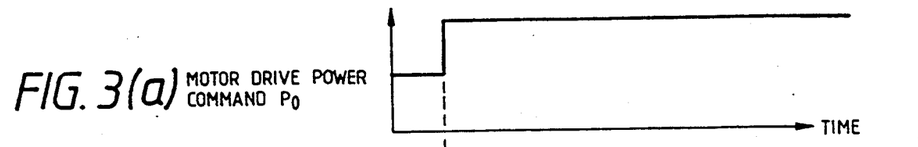
FIG. 3(a) to 3(g) show signal wave forms of the various parts of the control units in FIG. 1.

Responses made when the motor drive power command $P_0$ is increased in step as the graph of FIG. 3(a) at the point of time $t_0$ are shown.

Figure 3B:
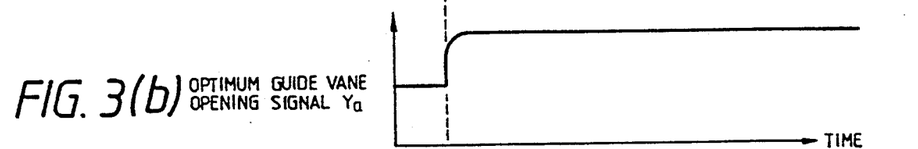
Figure 3C:
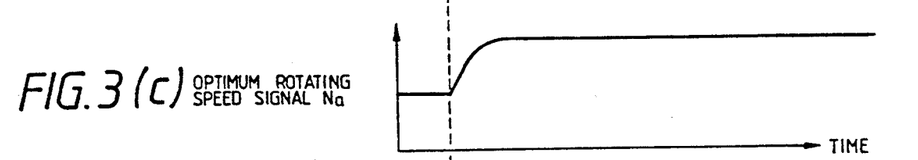
Figure 3D:
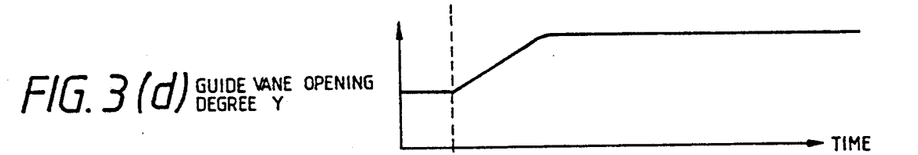
Figure 3E:
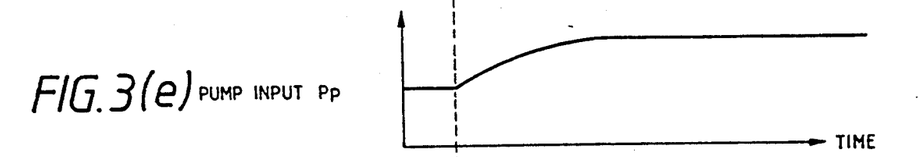
Figure 3F:
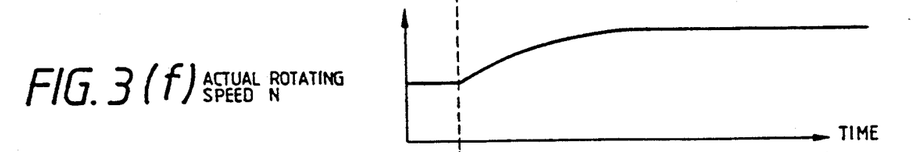
Figure 3G:
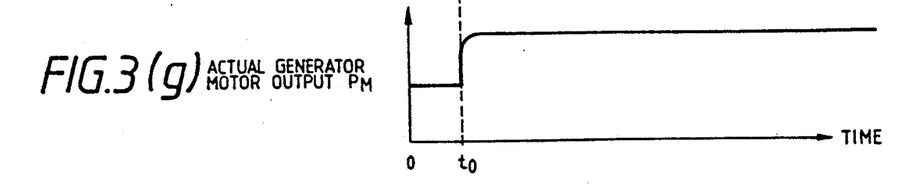

First, the actual generator motor output $P_M$ rises with a very short time constant as shown in the graph of FIG. 3(g).

The optimum guide vane opening signal Ya from the guide vane opening degree function generator 13 and the optimum rotating speed signal Na from the rotating speed function generator 12 respond as shown in the graphs of FIGS. 3(b) and 3(c), with their respective time constants.

An actual response Y of the guide vanes 25 to the optimum guide vane opening signal Ya in the graph of FIG. 3(d) is made as shown in the graph of FIG. 3(d). A straight line portion included in the response of Y of opening indicates that the opening speed of the guide vanes 25 is restricted by a traveling speed limiter for their guide vane servo-motor which is usually applied to a distributing valve for the guide vane servo-motor.

The actual rotating speed N of the pump turbine 4 is increased by a difference between the actual generator motor output $P_M$ in the graph 3(g) and the pump input $P_p$ in the graph 3(e), rises as shown in the graph 3(f) and stops rising when it finally reaches $N \doteq Na$.

An increase based on both an increase in the opening degree Y of opening of the guide vanes 25 and an increase in the rotating speed N of the pump turbine 4 is added to the pump input $P_p$, so that the pump input $P_p$ increases as shown in the graph 3(e).

In the graph 3(f), the actual rotating speed N of the pump turbine 4 varies slowly and stably, since the power correction signal generator 16 is designed to have a satisfactory damping.

This damping effect can be attained, for example, by forming the power control correction signal generator 16 by a shunt circuit of a proportional element and an integrating element, and suitably selecting the gains thereof.

The above is directed to a description of one embodiment of the variable speed pumping-up system according to the present invention in which the operation point of the pump turbine 4 remains in a normal operation region and does not approach the hump characteristic region very frequently.

The embodiment of the present invention is further provided with an operation point self-correcting function, which constitute the essential feature of the present invention, in the following manner.

First, a limit head calculator 22 determines the dynamic head $H_X$ (refer to FIG. 7) at the starting point of the hump characteristic region as it continuously detects the actual rotating speed N of the pump turbine 4 and the opening degree Y of the guide vanes 25 and as refers to the stored H-Q characteristic of the pump turbine with the detected parameters.

A comparator 23 is adapted to compare the dynamic head $H_X$ thus obtained with an actual measurement value of the total dynamic head H, and send a differential head signal $\epsilon H$ to a hump characteristic avoiding correction signal generator 24.

This hump characteristic avoiding correction signal generator 24 is adapted to output a rotating speed correction signal $\Delta Na$ for the pump turbine 4 in accordance with the degree of nearness of the operation point to the hump characteristic region, when the level of the differential head signal $\epsilon H$ has become abnormally low, i.e., when the operation point of the pump turbine 4 has approached abnormally close to the hump characteristic region.

This rotating speed correction signal $\Delta Na$ of the pump turbine 4 is inputted into the adder 18, in which the correction of the optimum rotating speed signal Na to $(Na+\Delta Na)$ is done.

Figure 2:
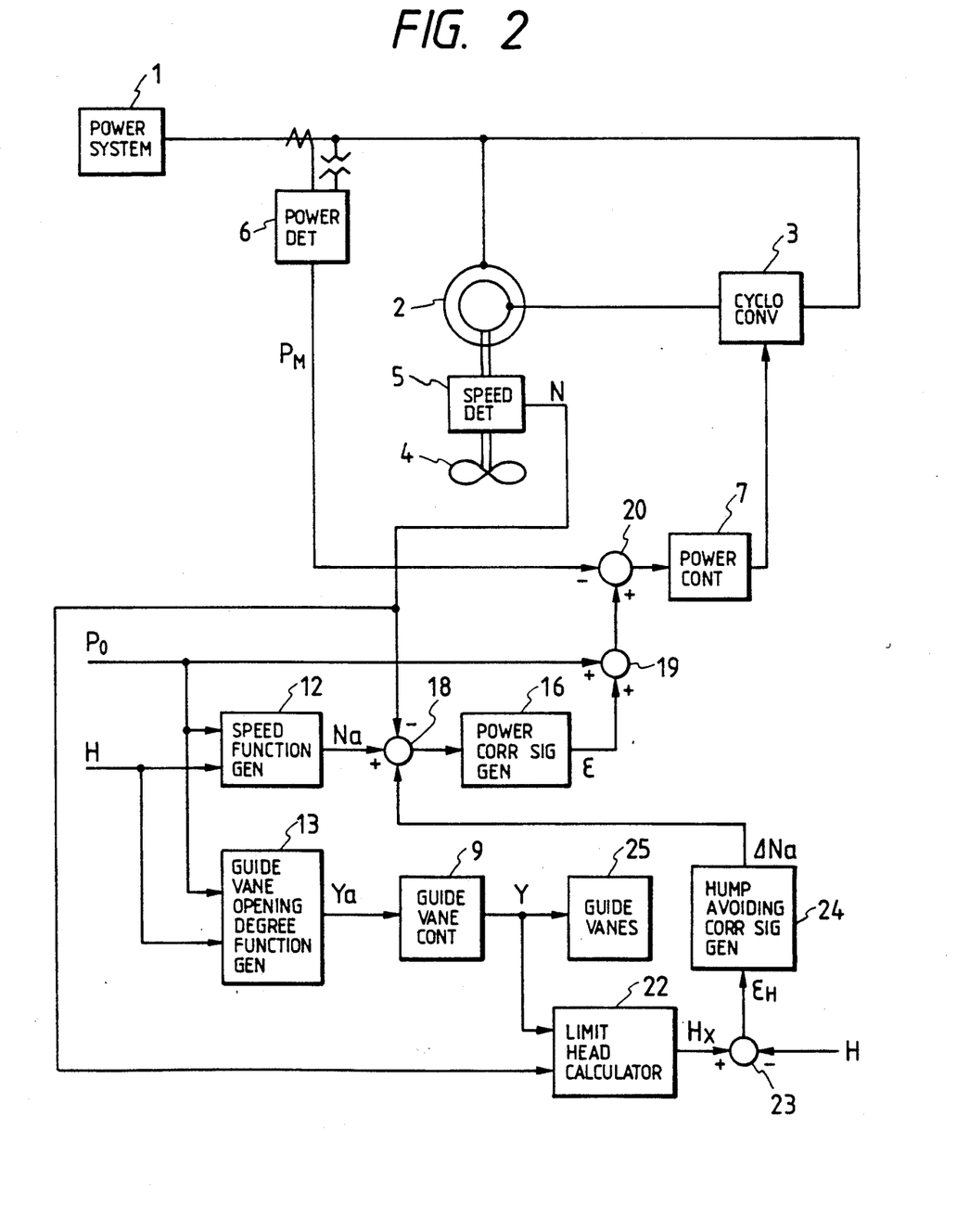
FIG. 2 shows one example of a variable speed pumping-up system using a winding type induction machine to which one embodiment of the present invention is applied.

FIG. 2 shows one example of the construction of a variable speed pumping-up system using the control circuit of FIG. 1 and a secondary winding type induction generator motor 2 is used as a variable speed generator motor. The reference numerals in FIG. 2 which are the same as those in FIG. 1 designate the same parts.

The primary side of the winding type induction machine 2 is connected to an electric power system 1, and the secondary side thereof to the cyclo converter 3, output power of the induction generator motor 2 being controlled by controlling the phase and the voltage of the AC excitation current from the cyclo converter 3.

An actual generator motor output $P_M$ is detected by a power detector 6 and inputted into a comparator 20, and an actual rotating speed N of the pump turbine 4 is detected by a rotating speed detector 5 and inputted into the adder 18.

Figure 4:
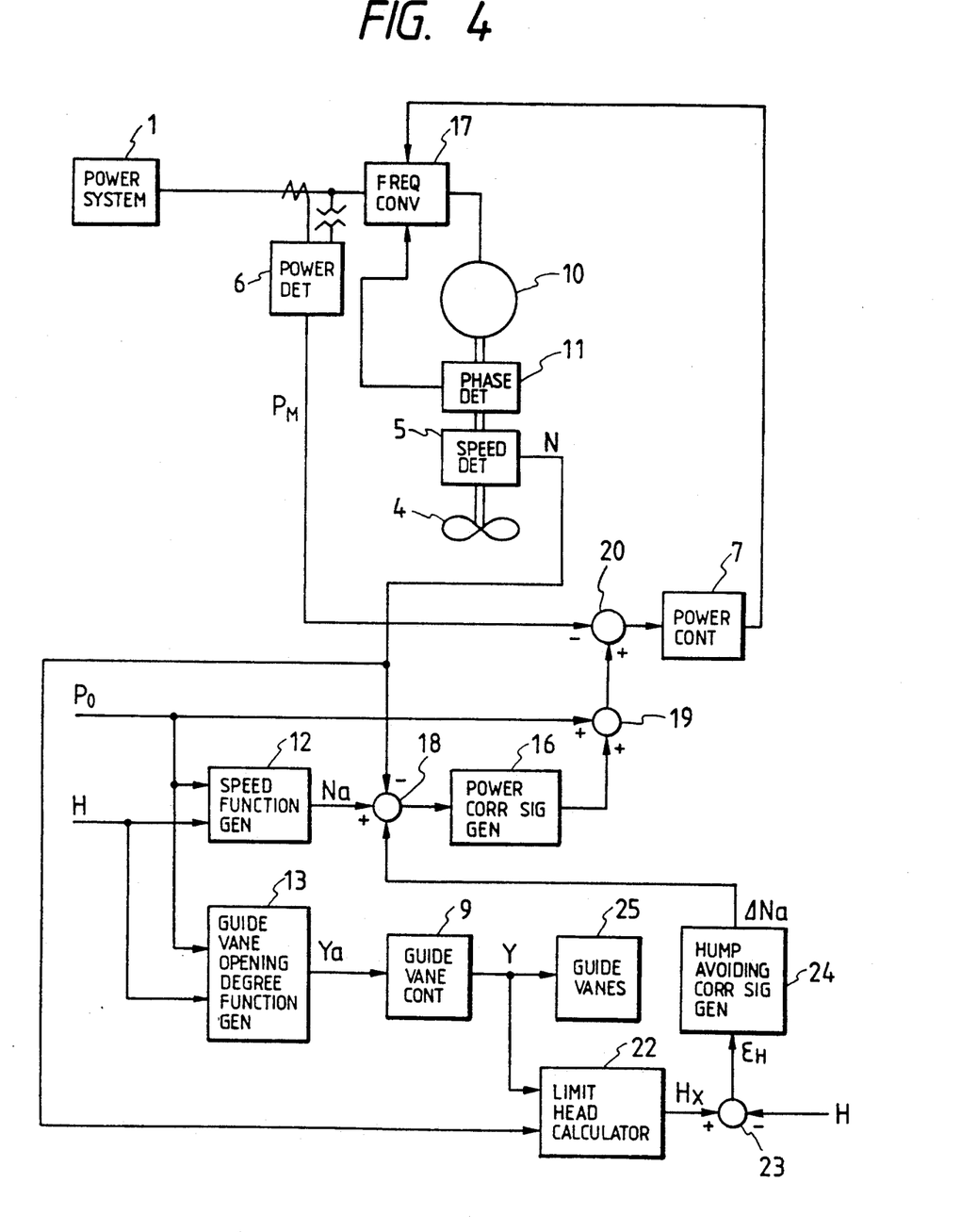
FIG. 4 shows an example of another type of flow pattern in a variable speed pumping-up system to which another embodiment of the present invention is applied.

FIG. 4 is a constructional diagram of another embodiment using the control circuit of FIG. 1, in which a synchronous machine 10 is used with a frequency converter 17 provided between the electric power system 1 and the synchronous machine 10. In order to produce a phase command to be directed to the frequency converter 17, a phase detector 11 is provided therein.

As is clear from the above stated description, the effect of this embodiment of the present invention resides in its capability of continuously monitoring the operation point of the variable speed pumping-up system constantly as to determine whether it is abnormally close to the hump characteristic region, taking a timely and proper countermeasure as necessary to prevent the operation point of the pump turbine 4 from falling into the hump characteristic region, and assuring a stable and reliable operation of the variable speed pumping-up system.

Designing a pump turbine apparatus so that the upstream side pipe line or the downstream side pipe line is shared with a plurality of pump turbines is done rather commonly for economical reasons, and the effect of this embodiment of the present invention in providing a variable speed pumping-up system which can be readily applied to this kind of system as well is very great.

Another embodiment of a variable speed pumping-up system according to the present invention will be explained with reference to FIGS. 10-13.

Figure 10:
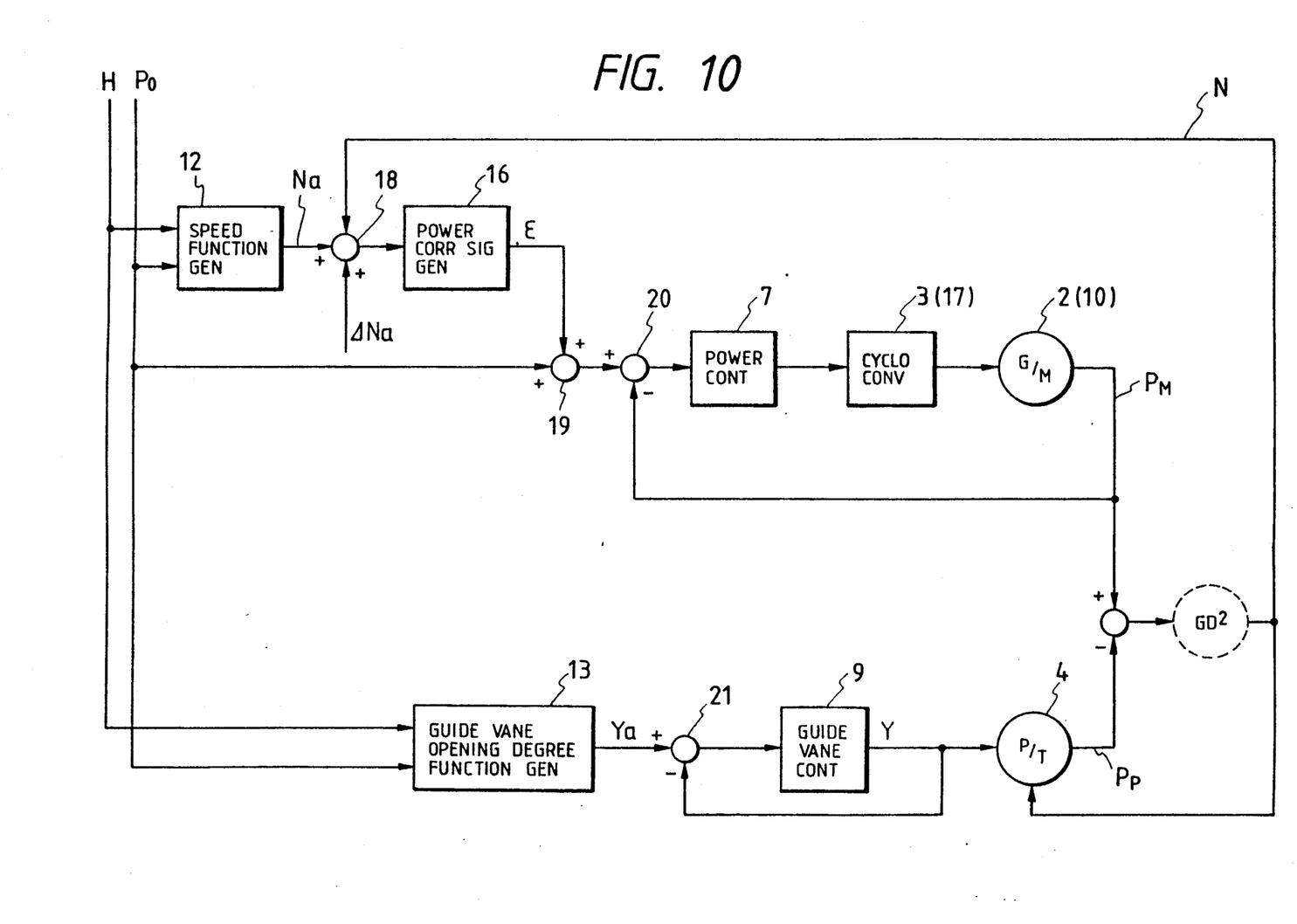
FIG. 10 is a control circuit showing in schematic block diagram form a variable speed pumping-up system according to another embodiment of the present invention.

FIG. 10 shows another schematic block diagram of a control circuit of the variable speed pumping-up system having another hydraulic machine sharing the pipe line according to the present invention. The reference numerals in FIG. 10 which are the same as those in FIG. 1 designate the same parts.

Figure 11:
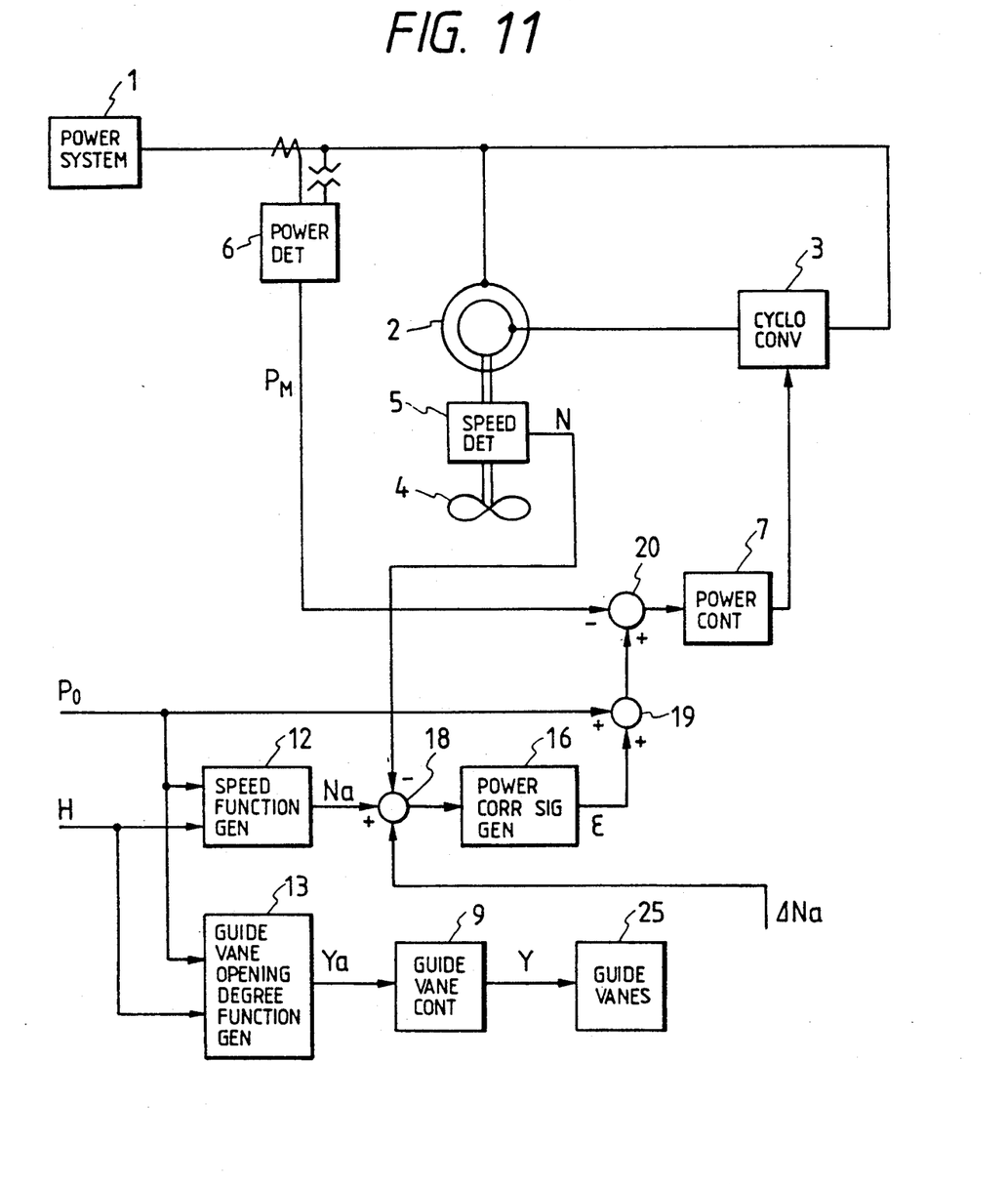
FIG. 11 shows another example of a variable speed pumping-up system using a winding type induction machine to which one embodiment of the present invention is applied.

FIG. 11 shows one example of the construction of a variable speed pumping-up system using the control circuit of FIG. 10. A secondary winding type induction generator motor 2 is used as a variable speed generator motor. The reference numerals in FIG. 11 which are the same as those in FIG. 10 and FIG. 2 designate the same parts.

When the variable speed pumping-up system having another hydraulic machine sharing the upstream side pipe line or the downstream side pipe line starts at the pumping-up mode or is operated in the output rapid-increase operation, the rotating speed N of the particular variable speed pumping-up power system is raised and corrected in advance by a predetermined rotating speed correction value $\Delta Na$ which is applied to the adder 18.

The predetermined rotating speed correction value $\Delta Na$ of the pump turbine 4 can be varied, needless to say, in accordance with the operation amount of another hydraulic machine.

Further, the predetermined rotating speed correction of $\Delta Na$ can be performed concurrently with the rapid change operation of the operation condition of the other hydraulic machine.

When the rapid operation of the other hydraulic machine finishes and the water hammering phenomena in the shared pipe line is set down, the predetermined rotating speed correction value $\Delta Na$ is brought to zero.

The response conditions of the particular variable speed pumping-up system are indicated together in FIG. 10 for the case when the above stated predetermined rotating speed value ($\Delta Na$) correction is performed.

Figure 12:
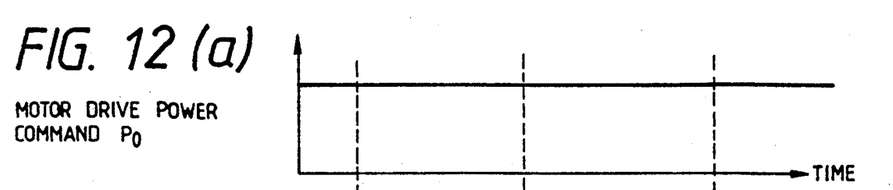
FIG. 12(a)–12(g) show signal wave forms of various parts of the control units in FIG. 10.

This embodiment shown in FIGS. 10, 11 and 12 differs from FIG. 3, in that the motor drive power command $P_0$ is not in motion, therefore the optimum guide vane opening signal Ya of the guide vanes 25 are not changed and accordingly the actual guide vane opening degree Y remains constant.

Figure 13:
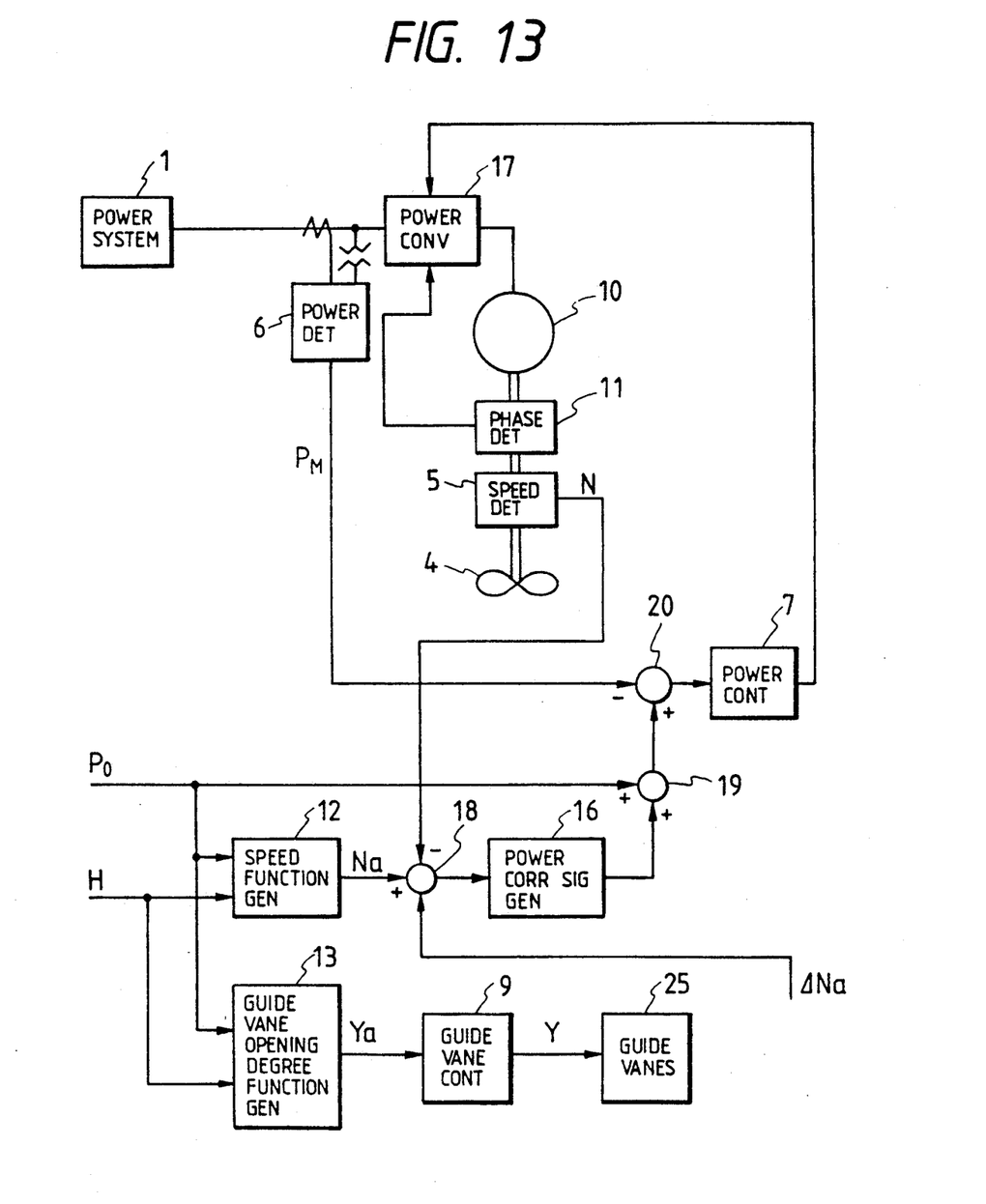
FIG. 13 shows an example of another type of variable speed pumping-up system to which another embodiment of the present invention is applied.

FIG. 13 is a constructional diagram of another embodiment using the control circuit of FIG. 10, in which a synchronous machine 10 is used with a frequency converter 17. The reference numerals in FIG. 13 which are the same as those in FIG. 11 and FIG. 4 designate the same parts.

As is clear from the above stated description, the effect of this embodiment of the present invention resides in its capability of avoiding the operation point of the pump turbine 4 from falling into the hump characteristic region even when the variable speed pumping-up system is subjected to the water hammering phenomena of another hydraulic machine sharing the same pipe line, and assuring a stable and reliable operation of the variable speed pumping-up system.

Designing a pump turbine apparatus so that the upstream side pipe line or the downstream side pipe line is shared with a plurality of pump turbines is made rather commonly for economical reasons, and the effect of this embodiment of the present invention in providing a variable speed pumping-up system which can be applied with a sense to security of this kind of system as well is significant.

We claim:

1. A variable speed pumping-up system connected to an electric power system having means to pump water, having electric motor means for driving said pump means and having a regular control means for operating said electric motor means in a regular control state at a variable rotating speed as a function of current operating conditions of said pump means while receiving electric power from said electric power system of a given frequency, comprising:
    said pump means exhibiting a hump characteristic in an operating region thereof; and
    said variable speed pumping-up system including an overriding control unit, said overriding control unit having means for monitoring operating conditions of said pump means including rotating speed, guide vane opening and dynamic head so that, when an operation point of said pump means closely approaches said hump characteristic region during regular control by said regular control means, said regular control means is substantially interrupted, and an overriding control by said overriding control unit is commenced to provide an extra acceleration to said pump means temporarily so that a close approach of said operation point of said pump means to said hump characteristic region is avoided.

2. A variable speed pumping-up system according to claim 1, wherein said monitoring means includes means for receiving as inputs at least a dynamic head (H) signal of said pump means, a degree of opening (Y) of adjustable guide vanes, and the rotating speed (N) of said pump means for determining the degree at which the operation point of said pump means becomes close to said hump characteristic region such that said overriding control is commended in accordance with the results of the determination by said monitoring means.

3. A method for controlling a variable speed pumping-up system, comprising:
    pumping water with pump means that exhibits a hump characteristic in a pump operation region thereof, said pump means having adjustable guide vanes;
    driving said pump means with motor means having a frequency converter and providing said motor means with electric power of a given frequency from an electric power system to drive said pump means in a regular control state at a variable rotating speed that is adjusted in accordance with actual operating conditions;
    calculating and storing beforehand model test data of said pump means including data of a starting point of said hump characteristic region as a function of dynamic head, the rotating speed of said pump means, and the opening degree of said guide vanes;

detecting a degree of opening of said guide vanes and the rotating speed of said pump means so that said starting point of said hump characteristic region can be calculated in response to the detected rotating speed of said pump means and the detected degree of opening of said guide vanes over an operational range of said pump means;

measuring an actual total dynamic head;

calculating a difference between said starting point of said hump characteristic region and said actually measured total dynamic head so that when said difference has become smaller than a predetermined level, said regular control state is substantially interrupted and an overriding control for said variable speed pumping-up system is commenced to provide an extra output to said motor means and correspondingly to provide an extra acceleration to said pump means temporarily so that an operation of said pump means in a hump characteristic region is avoided.

4. A method for controlling a variable speed pumping-up system, comprising:

pumping water with pump means operating in a pipe line shared upstream or downstream with another means to pump water, said pump means exhibiting a hump characteristic in a pump operating region thereof;

driving said pump means in a regular control state at a variable rotating speed with electric motor means in accordance with actual operating conditions, said motor means having a frequency converter and receiving a supply of electric power of a given frequency;

commencing an overriding control over said pump means that substantially interrupts said regular control state when an operation state of said another pump means with which said pipe line is shared abruptly changes, said overriding control temporarily correcting said rotating speed of said pump means and thereafter releasing said overriding control after a water hammering phenomena caused by said abrupt change in the operation state of another pump means has settled.

5. A method of controlling a variable speed pumping-up system according to claim 4, wherein when said another pump means with which said pipe line is shared is started or rapidly increased in its input in a pumping-up mode, said overriding control increases the rotating speed (N) of said pump or pump turbine (4) beforehand.

6. A method of controlling a variable speed pumping-up system according to claim 4, characterized in that when said another pump means with which said pipe line is shared is started or increased rapidly in its input in a pumping-up mode, said overriding control increases the rotating speed (N) of said pump or pump turbine (4) simultaneously.

7. A variable speed pumping-up system, comprising:

means to pump water exhibiting a hump characteristic in a pump operation region thereof, said pump means having adjustable guide vanes;

motor means having a frequency converter for driving said pump means, said motor means receiving electric power of a given frequency from an electric power system and control means for driving said pump means at a variable rotating speed that is adjusted in accordance with actual operating conditions in a regular control state;

means for calculating and storing beforehand model test data of said pump means including data of a starting point of said hump characteristic region as a function of dynamic head, the rotating speed of said pump means, and an opening degree of said guide vanes;

means for detecting the degree of opening of said guide vanes and for detecting the rotating speed of said pump means so that said starting point of said hump characteristic region can be calculated in response to the rotating speed of said pump means and the degree of opening of said guide vanes detected over an operational range of said pump means;

means for measuring an actual total dynamic head;

means for calculating a difference between said starting point of said hump characteristic region and said actually measured total dynamic head and means for substantially interrupting said control means and commencing an overriding control when said difference becomes smaller than a predetermined level to provide an extra output to said motor means and correspondingly to provide an extra acceleration to said pump means temporarily so that an operation of said pump means in a hump characteristic region is avoided.

* * * * *